United States Patent
Katsura

(10) Patent No.: US 10,455,116 B2
(45) Date of Patent: Oct. 22, 2019

(54) IMAGE PROCESSING DEVICE AND METHOD FOR CONTROLLING IMAGE PROCESSING DEVICE

(71) Applicant: KYOCERA Document Solutions Inc., Osaka (JP)

(72) Inventor: Kenichi Katsura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/029,283

(22) Filed: Jul. 6, 2018

(65) Prior Publication Data
US 2019/0028607 A1    Jan. 24, 2019

(30) Foreign Application Priority Data
Jul. 18, 2017    (JP) .................. 2017-139124

(51) Int. Cl.
*G06K 9/00* (2006.01)
*H04N 1/00* (2006.01)
*H04N 1/40* (2006.01)
*H04N 1/64* (2006.01)
*H04N 1/60* (2006.01)

(52) U.S. Cl.
CPC ..... *H04N 1/40062* (2013.01); *G06K 9/00409* (2013.01); *G06K 9/00449* (2013.01); *H04N 1/00331* (2013.01); *H04N 1/00411* (2013.01); *H04N 1/6072* (2013.01); *H04N 1/642* (2013.01); *G06K 2209/01* (2013.01)

(58) Field of Classification Search
CPC .......... G06K 9/00409; G06K 9/00449; G06K 9/00456; G06K 9/00476; G06K 2209/01; G06F 17/241; H04N 1/40062; H04N 1/56; H04N 1/00411

USPC ...... 358/1.9, 2.1, 1.11–1.18, 530, 3.06, 462; 715/256, 204, 243, 266; 382/190
See application file for complete search history.

(56) References Cited

U.S. PATENT DOCUMENTS

| | | | |
|---|---|---|---|
| 2007/0286507 A1* | 12/2007 | Mori ................... | G06K 9/00456 382/239 |
| 2008/0062483 A1* | 3/2008 | Morimoto ................ | H04N 1/56 358/530 |
| 2009/0304295 A1* | 12/2009 | Mori ................... | G06K 9/00456 382/239 |
| 2010/0253953 A1* | 10/2010 | Oota .................... | H04N 1/3333 358/1.9 |
| 2011/0252315 A1* | 10/2011 | Misawa ............... | G06F 17/2235 715/256 |

FOREIGN PATENT DOCUMENTS

JP    2008-282149 A    11/2008

* cited by examiner

*Primary Examiner* — Chad Dickerson
(74) *Attorney, Agent, or Firm* — Stein IP, LLC

(57) ABSTRACT

An image processing device has a layout analyzing portion extracting a character region from image data, an OCR processing portion generating text data of characters in the character region, and a document file generating portion. The document file generating portion selects either a first generation process or a second generation process based on the size of the character region. The first generation process is a process of generating a document file having a text box including text data attached to it. The second generation process is a process of generating a document file by writing the text data directly in the document file without using the text box.

10 Claims, 9 Drawing Sheets

<w:body>
<w:p w:rsidP="00434F26" w:rsidRDefault="00434F26···

⋮

<w:t>NEW PRODUCT INFORMATION</w:t>

⋮

<w:t> 1 ． OUTLINE</w:t>

⋮

</w:body>

IMAGE PROCESSING DEVICE AND METHOD FOR CONTROLLING IMAGE PROCESSING DEVICE

INCORPORATION BY REFERENCE

This application is based upon and claims the benefit of priority from the corresponding Japanese Patent Application No. 2017-139124 filed on Jul. 18, 2017, the entire contents of which are incorporated herein by reference.

BACKGROUND

The present disclosure relates to an image processing device that converts image data to generate a document file.

A paper document (original) is sometimes converted into an electronic format. In electronic conversion, a document is read. Then, image data acquired by reading is converted, and sometimes, a file in a format different from the file format of the image data is generated.

One example of a known technique for converting a paper document into an electronic format is as follows. Specifically, a known image processing device classifies image regions, performs image processing appropriate for each image region, arranges the data having undergone the image processing, generates the content data specifying the content of each image, and generates a plurality of sets of conversion data used for converting, based on the region classification, the content data into data applicable to application software. A document includes a plurality of kinds of information such as character strings and tables. Different types of software are suitable for editing of different kinds of information. Thus, when the image data acquired by reading is converted, a plurality of files in different formats are sometimes generated simultaneously. What is sought is to reduce the total amount of data to be generated as compared with when files are generated separately with different kinds of software used in editing.

When a paper document (original) is converted into an electronic format, document reading is performed. Image data acquired by reading is sometimes converted into a file in a particular format. Sometimes a setting specifying how to convert can be made. For example, a user selects one method out of a plurality of conversion methods. For example, a user selects a conversion method that allows convenient file editing after conversion. The image processing device adopts a set method to generate a new file from image data.

It is necessary to properly select a conversion method with consideration given to the content of pages of a document and the purpose of use of a generated file. Conventionally, when a document comprising a plurality of sheets is successively converted into an electronic format, one selected method is applied to all pages. The information (content) included in the document is different in every page. For example, some pages include a table and some do not. Some pages have more characters than others. Thus, inconveniently, the conversion method may not be suitable for all pages. On the other hand, to prevent inappropriate conversion, a conversion method can be set page by page. However, setting a conversion method page by page is troublesome to a user.

Here, the above-described known technology is a technology for reducing the total amount of data to be generated. Thus, the above-described known technology cannot solve the problem mentioned above.

SUMMARY

According to one aspect of the present disclosure, an image processing device includes a layout analyzing portion, an OCR processing portion, and a document file generating portion. The layout analyzing portion analyzes the layout of image data. The layout analyzing portion extracts from the image data a character region that includes characters. The OCR processing portion recognizes the characters included in the character region. The OCR processing portion generates text data. The document file generating portion calculates a proportion by dividing the area of the character region by the total area of the character region and a region other than the character region. The document file generating portion generates a document file by a first generation process when the proportion is lower than a threshold value. The document file generating portion generates the document file by a second generation process when the proportion is equal to or higher than the threshold value. The first generation process is a process of generating the document file having a text box including the text data attached thereto. The second generation process is a process of generating the document file by writing the text data directly in the document file without using the text box.

Further features and advantages of the present disclosure will become apparent from the description of embodiments given below.

BRIEF DESCRIPTION OF THE DRAWINGS

FIG. 8 is a diagram showing an example of a file in the XML format generated by the second generation process according to the embodiment.

DETAILED DESCRIPTION

In view of the above-mentioned problem with the conventional technology, the present disclosure is aimed at automatically selecting a document file generation process to facilitate editing of a document file, thereby removing the burden on a user. Hereinafter, with reference to FIGS. 1 to 9, an image processing device according to an embodiment will be described. As an example of the image processing device, a multifunction peripheral 100 will be described.

The multifunction peripheral 100 can read a document, and can also print and transmit a document. The multifunction peripheral 100 is an image forming apparatus as well. All features, such as structures and arrangements, described in connection with the embodiment are merely examples for the sake of description, and are in no way meant to limit the scope of the disclosure.

Figure 1:
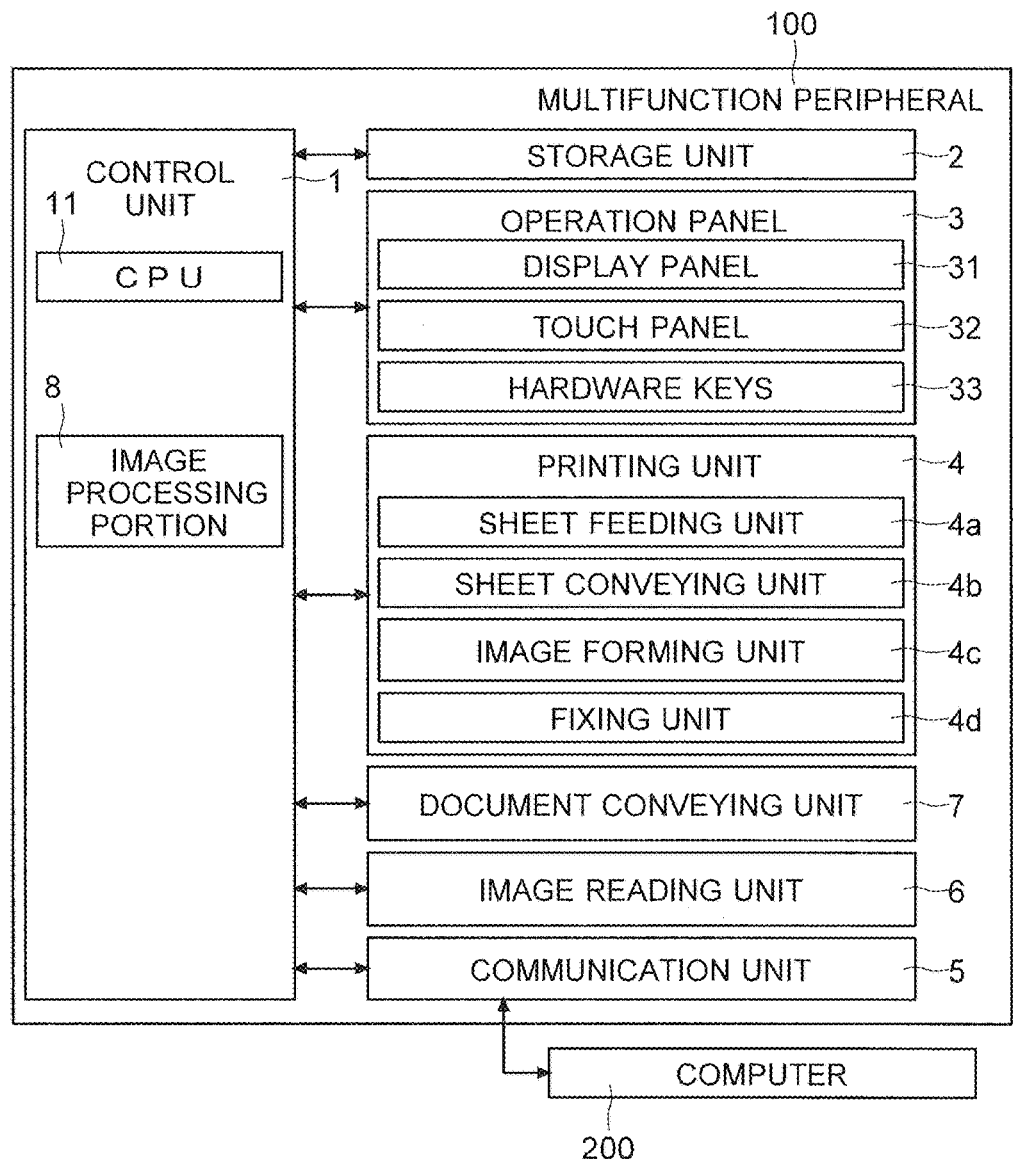
FIG. 1 is a diagram showing an example of a multifunction peripheral according to an embodiment.

Multifunction Peripheral 100:

With reference to FIG. 1, an example of the multifunction peripheral 100 according to the embodiment will be described. As shown in FIG. 1, the multifunction peripheral 100 includes a control unit 1, a storage unit 2, an operation panel 3, a printing unit 4, a communication unit 5, an image reading unit 6, and a document conveying unit 7.

The control unit 1 controls the multifunction peripheral 100. The control unit 1 includes a CPU 11 and an image processing portion 8. The storage unit 2 includes a non-volatile storage device such as ROM, flash ROM, or a storage (HDD). The storage unit 2 further includes a volatile storage device such as RAM. The control unit 1 controls relevant blocks by use of programs and data stored in the storage unit 2. The control unit 1 also controls document reading and image data generation. The image processing portion 8 is an integrated circuit dedicated to image processing. For example, the image processing portion 8 is an ASIC. The image processing portion 8 performs image processing on image data.

The operation panel 3 includes a display panel 31, a touch panel 32, and hardware keys 33. The control unit 1 makes the display panel 31 display setting screens and operation images. The operation images are images of, for example, buttons, keys, and tabs. Based on the output from the touch panel 32, the control unit 1 recognizes operation images which have been operated. The hardware keys 33 include a Start key and a numeric keypad. The touch panel 32 and the hardware keys 33 accept a user's operation for making settings. The control unit 1 communicates with the operation panel 3. The control unit 1 recognizes settings made.

The printing unit 4 includes a sheet feeding unit 4a, a sheet conveying unit 4b, an image forming unit 4c, and a fixing unit 4d. In a printing job, the control unit 1 makes the sheet feeding unit 4a feed out a sheet. The control unit 1 makes the sheet conveying unit 4b convey the sheet. The sheet conveying unit 4b discharges the printed sheet out of the apparatus. The control unit 1 makes the image forming unit 4c form a toner image based on image data. The control unit 1 makes the image forming unit 4c transfer the toner image to a transfer sheet. The control unit 1 makes the fixing unit 4d fix the transferred toner image to the sheet. In this way, the control unit 1 controls the operation of the printing unit 4.

The communication unit 5 is communicably connected to a computer 200. The communication unit 5 and the computer 200 communicate with each other via a network. The communication unit 5 includes a communication circuit and communication software. The communication unit 5 receives printing data transmitted from the computer 200. The printing data includes image data and data written in a page description language. The control unit 1 makes the printing unit 4 print based on the printing data received (print job).

The image reading unit 6 includes a document glass (unillustrated), and the document glass transmits light. A document is placed on the document glass. The image reading unit 6 irradiates the document placed on the document glass with light. The image reading unit 6 reads the face-down side of the document and generates image data. The control unit 1 makes the storage unit 2 store the image data generated.

The document conveying unit 7 can be opened and closed. When closed, the document conveying unit 7 is presses a document on the document glass. The document conveying unit 7 automatically conveys the placed document one sheet after another to a reading position (a contact glass for feed-reading). The glass for feed-reading (unillustrated) is provided in the image reading unit 6. The conveyed document passes across the glass for feed-reading. The image reading unit 6 irradiates the document passing across the contact glass for feed-reading with light. The image reading unit 6 reads the document and generates image data. The control unit 1 makes the storage unit 2 store the generated image data.

Figure 2:
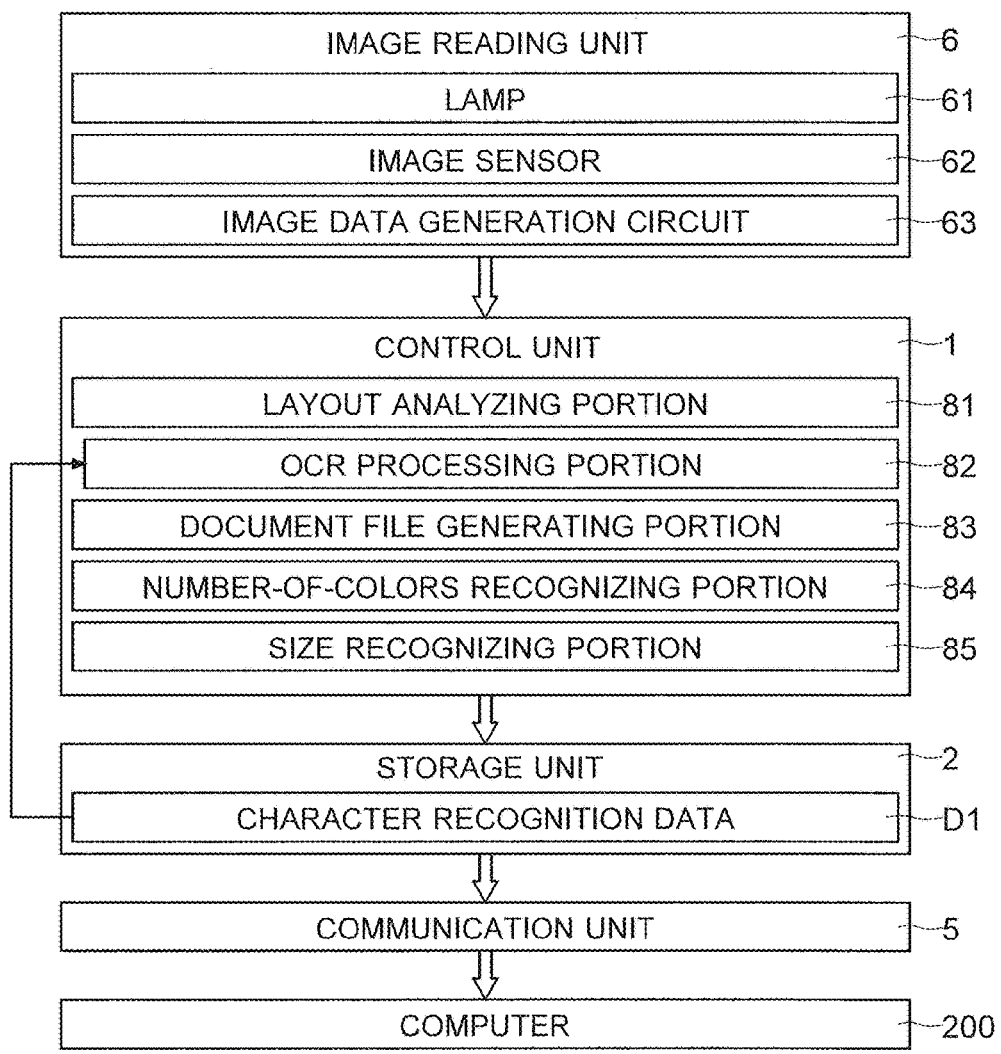
FIG. 2 is a diagram showing an example of an image reading unit and a control unit according to the embodiment.

Image Reading Unit 6 and Control Unit 1:

Now, with reference to FIGS. 2 and 3, an example of the image reading unit 6 and the control unit 1 according to the embodiment will be described. As shown in FIG. 2, the image reading unit 6 includes a lamp 61, an image sensor 62, and an image data generation circuit 63. In document reading, the lamp 61 irradiates a document with light. The lamp 61 includes, for example, LEDs. The image sensor 62 includes a plurality of light-receiving elements (pixels). The light-receiving elements are arrayed in the main scanning direction. The image sensor 62 is capable of color reading. Thus, the image sensor 62 includes line sensors of three colors, namely R, G, and B. The light reflected from the document strikes the light-receiving elements. The light-receiving elements of the line sensors each output an analog image signal commensurate with the amount of received light (the amount of reflected light).

The image data generation circuit 63 generates image data based on analog image signals fed out from the image sensor 62. The image data generation circuit 63 includes an adjustment circuit for adjusting analog image signals. The adjustment circuit is, for example, an amplification circuit or an offset circuit. The image data generation circuit 63 further includes an A-D conversion circuit. The A-D conversion circuit converts the adjusted analog image signals into digital values. The image data generation circuit 63 further includes a correction circuit. The correction circuit corrects deviations in the digital values resulting from the light emission characteristics of the lamp 61 and the reading characteristics of the image sensor 62. The correction circuit, for example, performs shading correction.

Here, the multifunction peripheral 100 generates a document file 10 from the image data acquired by reading. Specifically, the control unit 1 (the CPU 11 and the image processing portion 8) generates a document file 10 from the image data. As shown in FIG. 2, in relation to the generation of a document file 10, the control unit 1 includes a layout analyzing portion 81, an OCR processing portion 82, a document file generating portion 83, a number-of-colors recognizing portion 84, and a size recognizing portion 85.

The CPU 11 can operate as one or more of the layout analyzing portion 81, the OCR processing portion 82, the document file generating portion 83, the number-of-colors recognizing portion 84, and the size recognizing portion 85. In this case, based on the programs stored in the storage unit 2, the CPU 11 performs the process. Here, one or more of the layout analyzing portion 81, the OCR processing portion 82, the document file generating portion 83, the number-ofportion 85 can be provided as hardware (a circuit). For example, a circuit can be provided within, as a part of, the image processing portion 8.

The layout analyzing portion 81 analyzes the layout of the image data. Then, the layout analyzing portion 81 extracts from the image data, for example, a character region 91, a diagram region 92, and a table region 93. The character region 91 is a region that includes a character string (characters) alone. The diagram region 92 is a region that includes an illustration such as a figure or a picture. The table region 93 is a region that includes a table. A table includes a frame and ruled lines. A frame can have characters inside it. The layout analyzing portion 81 can perform an inclination correction process for proper extraction of regions.

The algorithm for extracting the regions can be set as desired. Any algorithm by which the regions can be extracted will do. For example, the layout analyzing portion 81 extracts blocks (units) as images from the image data. Specifically, the layout analyzing portion 81 extracts rectangular blocks. For example, the layout analyzing portion 81 binarizes the image data. Then, the layout analyzing portion 81 recognizes, in the binarized data, a blank region having a width of a previously set first threshold value or more. The first threshold value is stored in the storage unit 2. The layout analyzing portion 81 can set, in the image data, within a region corresponding to the blank region, boundaries between blocks. The layout analyzing portion 81 can group (integrate) together, in the binarized data, black pixels within a predetermined distance. Then, the layout analyzing portion 81 recognizes minimum rectangles that surround grouped pixel groups. The layout analyzing portion 81 can recognize, in the image data, a region in a rectangular shape as one block. The layout analyzing portion 81 may extract blocks by any other methods.

Figure 3:
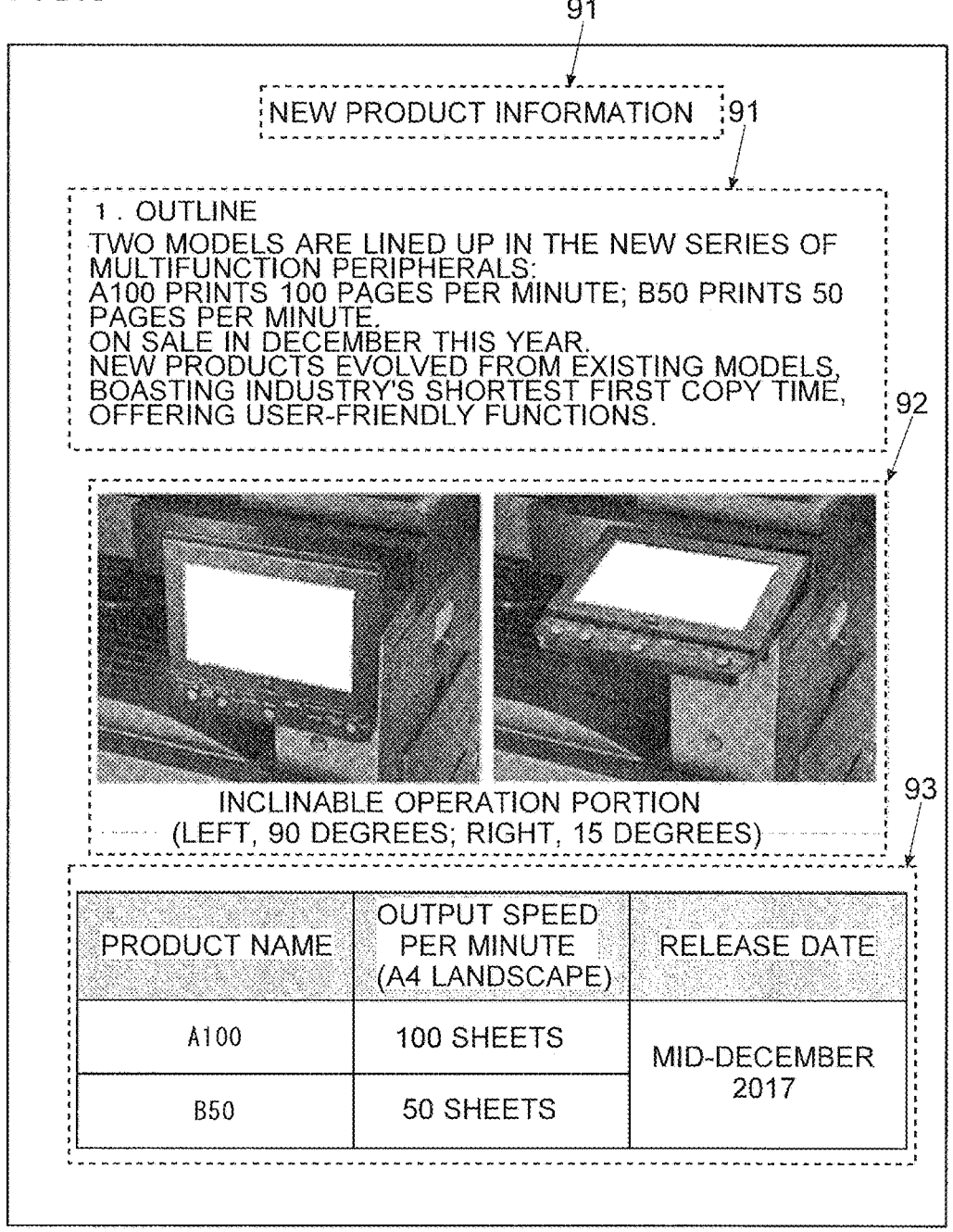
FIG. 3 is a diagram showing an example of image data acquired by document reading.

In FIG. 3, an example of extracted blocks is indicated by dotted-line frames. Next, the layout analyzing portion 81 classifies the extracted blocks among the character region 91, the diagram region 92, and the table region 93.

For example, the layout analyzing portion 81 recognizes, of pixels contained in a block, pixels that have a pixel value equal to or higher than a predetermined density. The predetermined density is previously set. The layout analyzing portion 81 sets a circumscribing rectangle for each patch of connected pixels having a pixel value equal to or higher than the predetermined density. For example, for black characters, a rectangle is set that surrounds the black characters.

For diagrams (pictures) and tables, circumscribing rectangles are larger. Thus, when all the circumscribing rectangles in a block have a value lower than a previously set second threshold value, the layout analyzing portion 81 classifies the block as the character region 91. The second threshold value is stored in the storage unit 2. In the rest of the blocks, the layout analyzing portion 81 recognizes straight line components. For example, the layout analyzing portion 81 recognizes straight lines (line segments) by the Hough transform. The layout analyzing portion 81 classifies as the table region 93 a block in which the end parts of the straight lines are connected together so as to form a table. The layout analyzing portion 81 classifies as the diagram region 92, of the extracted blocks, a block which is not classified either as the character region 91 or the table region 93. The layout analyzing portion 81 may perform the classification by any other methods.

The OCR processing portion 82 performs a character recognition process in the character region 91. The OCR processing portion 82 recognizes a character string (row) included in the character region 91. For example, the OCR processing portion 82 surrounds a character string with a frame. The OCR processing portion 82 recognizes individual characters included in the character string. The OCR processing portion 82 surrounds each character with a frame based on intervals (blanks) between characters. Instead, the OCR processing portion 82 may recognize individual characters by pattern matching. Or, the OCR processing portion 82 may recognize individual characters by recognizing their respective features. Character recognition data D1 for character recognition is stored in the storage unit 2. The OCR processing portion 82 recognizes characters by use of the character recognition data D1. Then, the OCR processing portion 82 generates text data T1 of the characters included in the character region 91.

The document file generating portion 83 generates a document file 10 based on the image data fed to it. The document file 10 includes the text data T1 generated by the OCR process. The document file generating portion 83 selects either a first generation process or a second generation process for every image data (page). The document file generating portion 83 generates the document file 10 by performing the selected generation process.

The document file generating portion 83 generates as a document file 10 a file in an XML (extensible markup language) format. The document file generating portion 83 generates a document file 10 in a format usable in document creation software (word processing software). The word processing software is, for example, Word by Microsoft. Instead, the document file generating portion 83 may generate a document file 10 in a format usable in other word processing software. Or, the document file generating portion 83 may generate as a document file 10 a file in any format other than XML.

The number-of-colors recognizing portion 84 counts the number of colors used in the characters included in the character region 91. The upper limit value of the number of colors is set as desired. For example, the number-of-colors recognizing portion 84 excludes, of the pixels included in the character region 91, pixels that have a pixel value which is considered to be white. Then, the number-of-colors recognizing portion 84 classifies the rest of the pixels into different colors, namely black, gray, red, yellow, green, blue, and purple. For each color, the range of the pixel value is previously set. Intermediate colors (orange, yellow-green, blue-green, blue-purple, red-purple) between red, yellow, green, blue, and purple may be counted in the number of colors. In this case, the number-of-colors recognizing portion 84 classifies the pixels into twelve colors. Then, the number-of-colors recognizing portion 84 counts the number of colors into which the pixels have been classified. For example, when the pixels included in the character region 91 are classified into black, red, and green, the number-of-colors recognizing portion 84 recognizes that the number of colors is three.

The size recognizing portion 85 recognizes the sizes of individual characters included in the character region 91. The size recognizing portion 85 recognizes the size of each character based on the height and the width of the character string circumscribed by the OCR processing portion 82. Instead, the size recognizing portion 85 may recognize the size of each character based on the sizes of the frames for individual characters circumscribed by the OCR processing portion 82.

The document file 10 generated from the image data by the control unit 1 is stored in the storage unit 2. Then, the control unit 1 makes the communication unit 5 transmit the generated document file 10 to the computer 200 set as a destination. Users can edit the document file 10 by using the computer 200 and the software installed on the computer 200.

The operation panel 3 accepts an instruction to execute a job (document generation job) to generate a document file 10 by reading a document. The operation panel 3 further accepts the setting of a transmission destination for the generated document file 10. Users may sometimes want to store the document file 10 in the multifunction peripheral 100. In this case, the storage unit 2 can be set as the destination. For example, the operation panel 3 accepts a setting specifying a folder in the storage unit 2 as the destination.

First Generation Process:

Now, with reference to FIGS. 4 and 5, an example of a first generation process according to the embodiment will be described. The first generation process is one method for generating a document file 10. In the first generation process, the document file generating portion 83 generates a document file 10 having the text data T1 of the characters included in the character region 91 attached to it as an object. An object that includes the text data T1 of the characters included in the character region 91 is referred to as a text box 10a.

Figure 4:
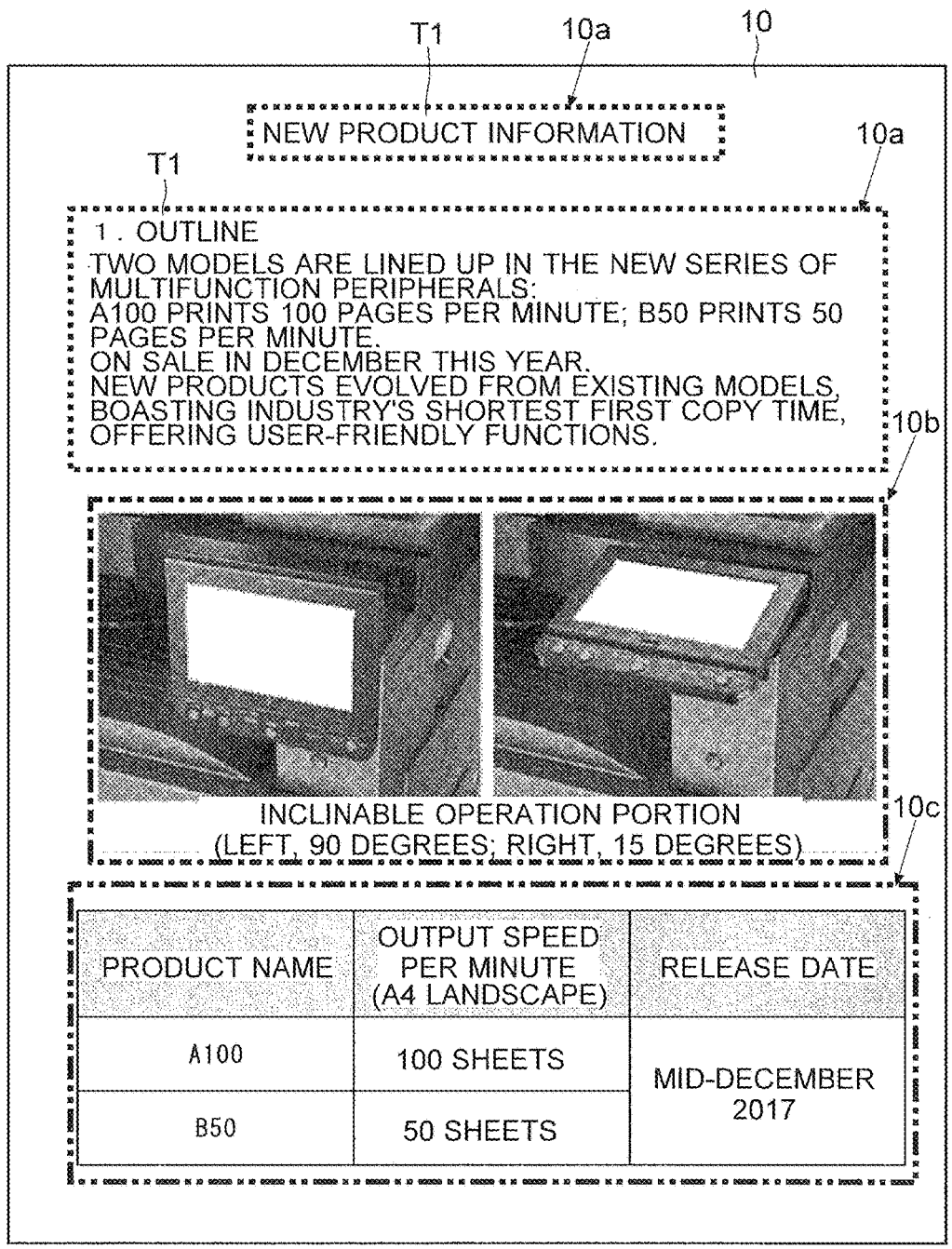
FIG. 4 is a diagram showing an example of a document file generated by a first generation process according to the embodiment.

FIG. 4 shows an example of the document file 10 generated by the first generation process based on the image data acquired by document reading shown in FIG. 3. In FIG. 4, an example of an outer frame of the text box 10a is indicated by a thick dotted line.

In the first generation process, the document file generating portion 83 further generates a document file 10 having the diagram region 92 attached to it as an object. In the first generation process, the document file generating portion 83 cuts out (copies) the diagram region 92 from the image data. Then, the document file generating portion 83 attaches the image data of the diagram region 92 as an image object 10b. In FIG. 4, an example of an outer frame of the image object 10b corresponding to the diagram region 92 is indicated by a thick dash-dot line.

In the first generation process, the document file generating portion 83 further generates a document file 10 having the table region 93 attached to it as an object. In the first generation process, the document file generating portion 83 converts the table region 93 from the image data to generate a table (table data 10c) set in ruled lines. Here, the OCR processing portion 82 recognizes the characters and numbers in the table. Then, the document file generating portion 83 attaches as an object the data of the table set in ruled lines. In FIG. 4, an example of an outer frame of the table data 10c corresponding to the table region 93 is indicated by a thick dash-dot-dot line. Instead, the document file generating portion 83 may cut out the table region 93 as it is from the image data. Then, the document file generating portion 83 may attach the image data of the table region 93 as an image object 10b.

The document file generating portion 83 generates a document file 10 in which objects (the text box 10a, the image object 10b, and the table data 10c) are arranged at the same positions as in the document. The document file generating portion 83 sets the sizes of the objects to make these the same as in the image data. Thus, it is possible to generate a document file 10 very similar to the document.

Figure 5:
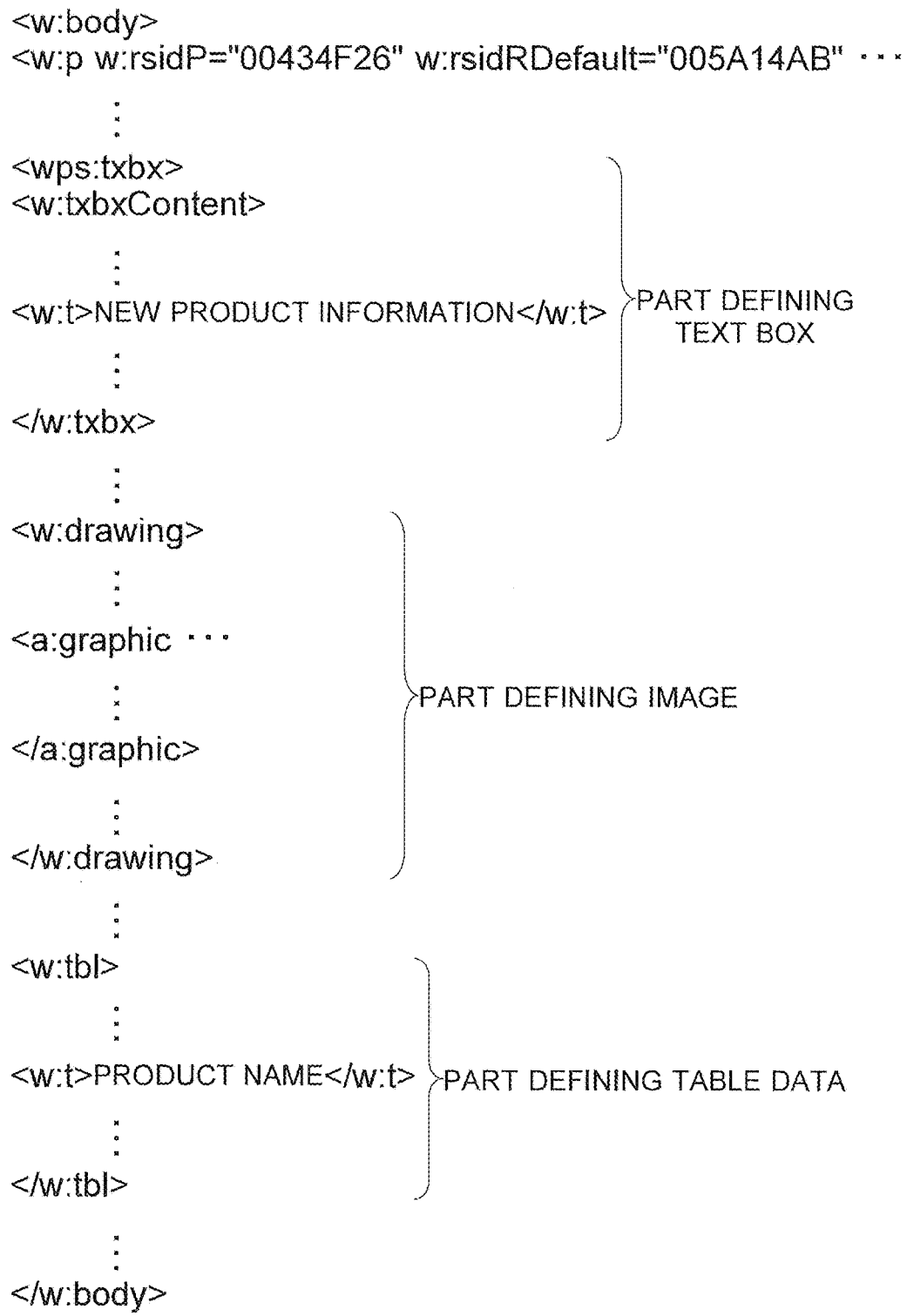
FIG. 5 is a diagram showing an example of a file in an XML format generated by the first generation process according to the embodiment.

FIG. 5 shows an example of a generated XML document. An XML file includes tags that indicate the names of elements. In an XML file, <element-name> is a start tag, and </element-name> is an end tag. For example, in FIG. 5, "w:body" is the name of an element. In FIG. 5, <w:body> is a start tag, and </w:body> is an end tag. When a document file 10 is generated by the first generation process based on the image data of the document shown in FIG. 3, the document file 10 includes as elements the text box 10a, the image object 10b, and the table data 10c. Thus, as shown in FIG. 5, the document file generating portion 83 generates an XML file that includes parts defining the text box 10a, the image object 10b, and the table data 10c respectively.

To the document file 10 generated by the first generation process, the elements are attached as objects. This advantageously makes it easy, in editing, to change the layout of characters, diagrams, and tables. In other words, it is advantageously easy to rearrange the layout.

Second Generation Process:

Now, with reference to FIGS. 6 to 8, an example of a second generation process according to the embodiment will be described. The second generation process is one method for generating a document file 10. In the second generation process, the document file generating portion 83 does not use the text box 10a. The document file generating portion 83 generates a document file 10 having the text data T1 directly written in it.

Figure 6:
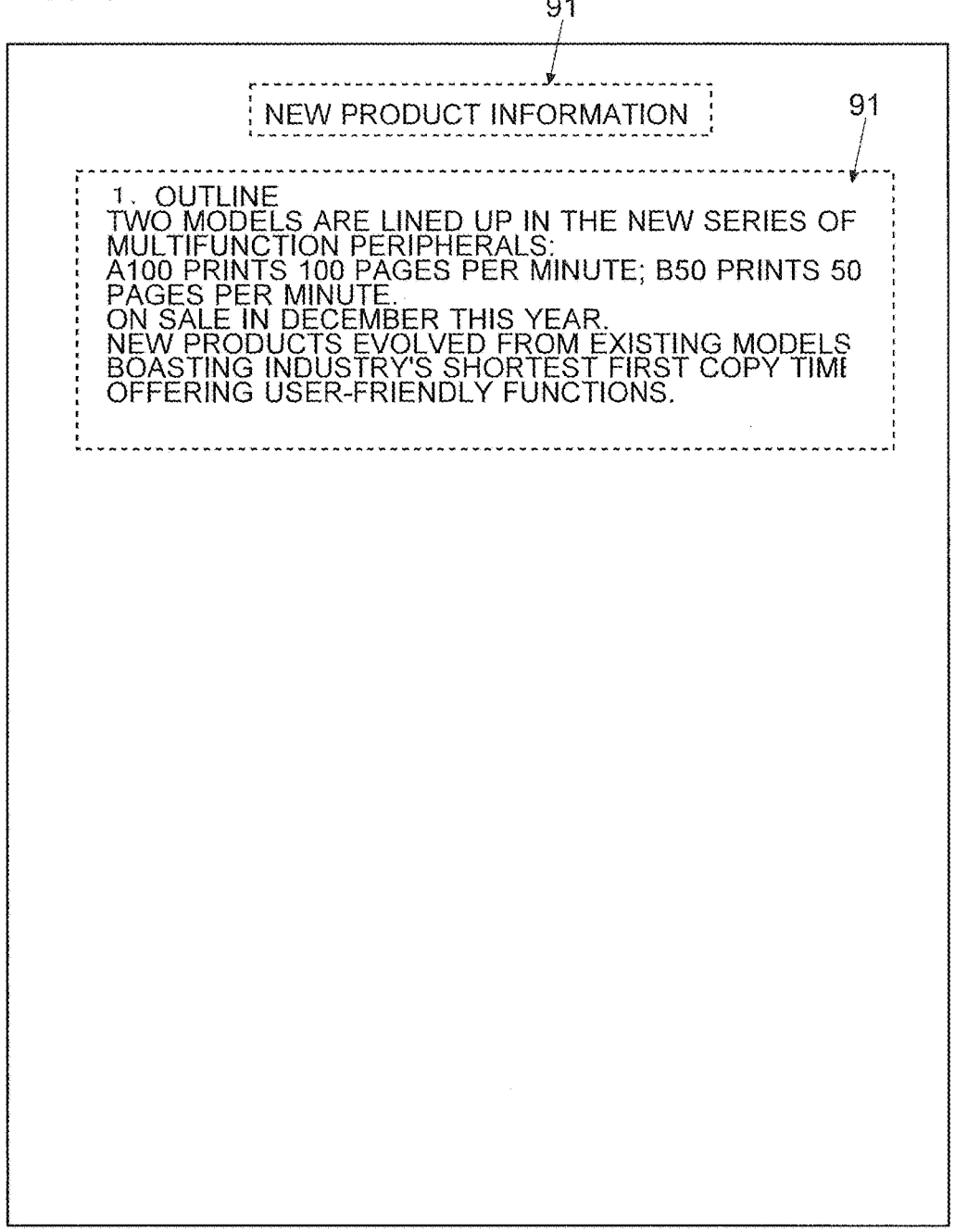
FIG. 6 is a diagram showing another example of the image data (document)

FIG. 6 shows, for the sake of convenience, the image data of a document obtained by omitting the diagram and the table from the document in FIG. 3. Accordingly, the document in FIG. 6 includes no diagram region 92 or table region 93. Thus, in the document in FIG. 6, the layout analyzing portion 81 recognizes two character regions 91.

Figure 7:
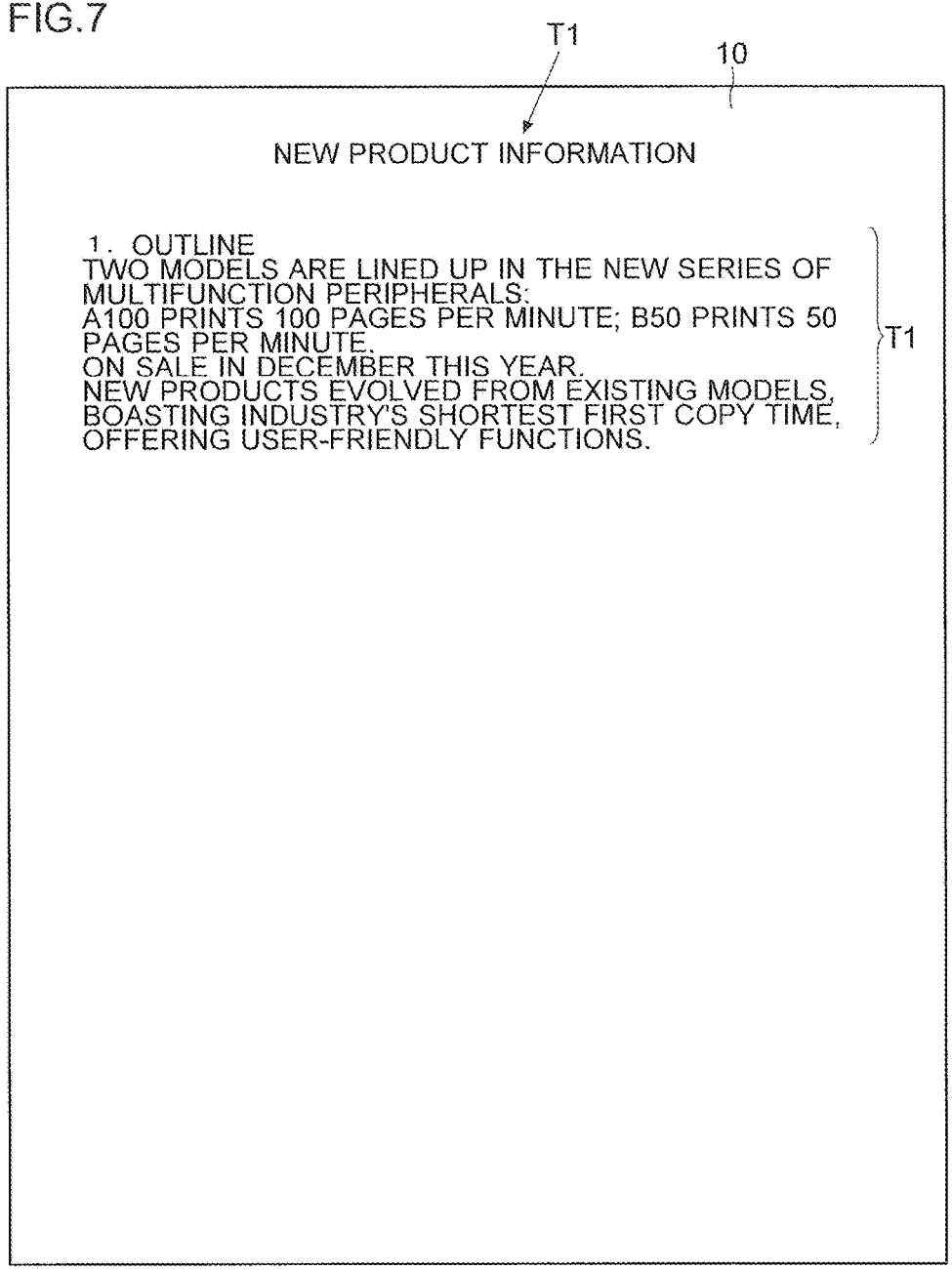
FIG. 7 is a diagram showing an example of a document file generated by a second generation process according to the embodiment.

FIG. 7 shows an example of a document file 10 generated by the second generation process based on the image data acquired by reading. In the second generation process, the document file generating portion 83 directly writes in a document file 10 the text data T1 of the characters included in the character region 91.

FIG. 8 shows an example of an XML document generated by the second generation process. When a document file 10 is generated by the second generation process, the document file 10 does not include the text box 10a as an element. Thus, as shown in FIG. 8, the document file generating portion 83 generates an XML file that does not use the text box 10a. The document file generating portion 83 generates an XML file that defines the text data T1 directly in the body of the document file 10.

In the second generation process, when the image data includes the diagram region 92, the document file generating portion 83 generates a document file 10 having the diagram region 92 attached to it as an image object 10b. Also, in the second generation process, when the image data includes the table region 93, the document file generating portion 83 generates a document file 10 having the table region 93 attached to it as an object (table data 10c). These features are shared with the first generation process.

To the document file 10 generated by the second generation process, the text data T1 is directly attached. This advantageously makes it easy to invoke a select-all, copy, or paste for text. In other words, it is advantageously easy to edit text.

Flow of Generation of Document File 10:

Now, with reference to FIG. 9, an example of the flow of generation of a document file 10 in the multifunction peripheral 100 according to the embodiment will be described. The flow in FIG. 9 starts when an instruction to execute a document generation job is entered on the operation panel 3. Based on communication with the operation panel 3, the control unit 1 recognizes that the instruction to execute a document file generation job has been entered.

First, the control unit 1 makes the image reading unit 6 read a document (Step #1). Then, the control unit 1 makes the image reading unit 6 generate image data of the document (Step #2). Next, the control unit 1 makes the layout analyzing portion 81 conduct a layout analysis on the image data (Step #3). The layout analyzing portion 81 classifies extracted blocks among the character region 91, the diagram region 92, and the table region 93 (Step #4). Then, the OCR processing portion 82 recognizes characters in the character region 91 and the table region 93 (Step #5).

Next, the document file generating portion 83 (control unit 1) calculates the area of the character region 91 (Step #6). The document file generating portion 83 calculates the total area of the character region 91 and the other regions (Step #7). Then, the document file generating portion 83 calculates the proportion by dividing the area of the character region 91 by the total area (Step #8). The larger the area of the character region 91 is, the higher the proportion is.

To calculate the area, the document file generating portion 83 counts the number of dots (number of pixels) in the character region 91. To calculate the total area, the document file generating portion 83 adds up the number of dots in the character region 91, the number of dots in the diagram region 92, and the number of dots in the table region 93.

Then, the document file generating portion 83 sets a threshold value (Step #9). Here, the document file generating portion 83 can set a previously set reference value as a threshold value. The reference value is, for example, a value within the range of 40% to 60% (0.4 to 0.6). Then, the document file generating portion 83 checks whether or not the proportion is equal to or higher than the threshold value (Step #10).

If the proportion is lower than the threshold value (No in Step #10), the character region 91 in the image data is small. That is, it can be said that there are a small quantity of character strings (text). A document file 10 with such image data can have a high frequency of changing of the layout. Thus, if the proportion is lower than the threshold value (No in Step #10), the document file generating portion 83 generates a document file 10 by performing the first generation process (Step #11). Then, the flow ends (End).

For example, with the image data in FIG. 3, the proportion of the character region 91 is approximately 30% (0.3). In this case, to facilitate changing of the layout, the document file generating portion 83 generates a document file 10 by the first generation process.

If the proportion is equal to or higher than the threshold value (Yes in Step #10), it is supposed that, in the image data, there are a large quantity of character strings (text). Thus, it is considered that a document file 10 with such image data has a high frequency of editing of the document itself (character strings) rather than that of changing of the page layout. Thus, if the proportion is equal to or higher than the threshold value (Yes in Step #10), the document file generating portion 83 generates a document file 10 by the second generation process (Step #12). Then, the flow ends (End).

For example, with the image data in FIG. 6, no diagrams or tables are included. Thus, the proportion of the character region 91 is 100%. In this case, to facilitate editing of character strings, the document file generating portion 83 generates a document file 10 by the second generation process.

Here, in the image data (document), a plurality of colors can be used in the characters. Character strings are sometimes colored for emphasis. For example, a heading character string can be colored in red. For another example, some text can be colored in blue for emphasis. That is, a document can be colorful. When characters of a plurality of colors are arranged, a user may sometimes want to move character strings by the color. The larger the number of colors used in the characters is, the more likely editing to change the layout is to be performed.

Thus, prior to Step #9, the number-of-colors recognizing portion 84 can count the number of colors used in the characters included in the character region 91. Then, at Step #9, the larger the number of colors is, the higher the document file generating portion 83 can set the threshold value. For example, the document file generating portion 83 obtains a first calculation value by multiplying the number of colors by a previously set coefficient. The coefficient is stored in the storage unit 2. The document file generating portion 83 can set as a threshold value the value obtained by adding the first calculation value to the previously set reference value. Then, the operation panel 3 can accept a setting specifying whether or not to adjust the threshold value according to the number of colors. When the setting is made to set the threshold value according to the number of colors, the larger the number of colors is, the higher the document file generating portion 83 sets the threshold value. The larger the number of colors is, the larger the amount is by which the document file generating portion 83 adjusts the threshold value. The smaller the number of colors is, the smaller the amount is by which the document file generating portion 83 adjusts the threshold value.

The document file generating portion 83 puts, in the document file 10, characters in the same or similar colors as those in the document (image data). When generating a document file 10 by the first generation process, the document file generating portion 83 puts, in the document file 10, a text box 10a that includes characters in the same or similar colors as those in the document (image data). On the other hand, when generating a document file 10 by the second generation process, the document file generating portion 83 attaches, to the body of the document, characters in the same or similar colors as those in the document (image data).

A document sometimes includes characters of various sizes. In character strings to be emphasized, the size (point) of characters can be increased. For example, the size of characters in a heading is sometimes made larger than that of the other characters. Then, when character strings of various sizes are arranged, a user may sometimes want to move character strings by the size. When characters of various sizes are arranged, editing of layout change is more likely to be performed than editing of text.

Thus, prior to Step #9, the size recognizing portion 85 can recognize the sizes of the characters included in the character region 91. Then, at Step #9, the larger the number of different sizes used in the characters is, the higher the document file generating portion 83 can set the threshold value. For example, the document file generating portion 83 obtains a second calculation value by multiplying the number of different sizes used in the characters by the coefficient. The document file generating portion 83 can set as a threshold value the value obtained by adding up the second calculation value and the reference value. The operation panel 3 can accept a setting specifying whether or not to adjust the threshold value according to the number of different sizes. When the setting is made to set the threshold value according to the number of different sizes, the larger the number of different sizes is, the higher the document file generating portion 83 sets the threshold value. The larger the number of different sizes is, the larger the amount is by which the document file generating portion 83 adjusts the threshold value. The smaller the number of different sizes is, the smaller the amount is by which the document file generating portion 83 adjusts the threshold value. The document file generating portion 83 can set as a threshold value the value obtained by adding up the first calculation value, the second calculation value, and the reference value.

The operation panel 3 can further accept the setting of a coefficient. Once the coefficient is set, the document file generating portion 83 sets a threshold value by use of the set coefficient.

The document file generating portion 83 puts, in the document file 10, characters in the same or similar sizes as those in the document (image data). When generating a document file 10 by the first generation process, the document file generating portion 83 puts, in the document file 10, a text box 10a that includes characters in the same or similar sizes as those in the document (image data). On the other hand, when generating a document file 10 by the second generation process, the document file generating portion 83 attaches, to the body of the document, characters in the same or similar sizes as those in the document (image data).

Figure 9:
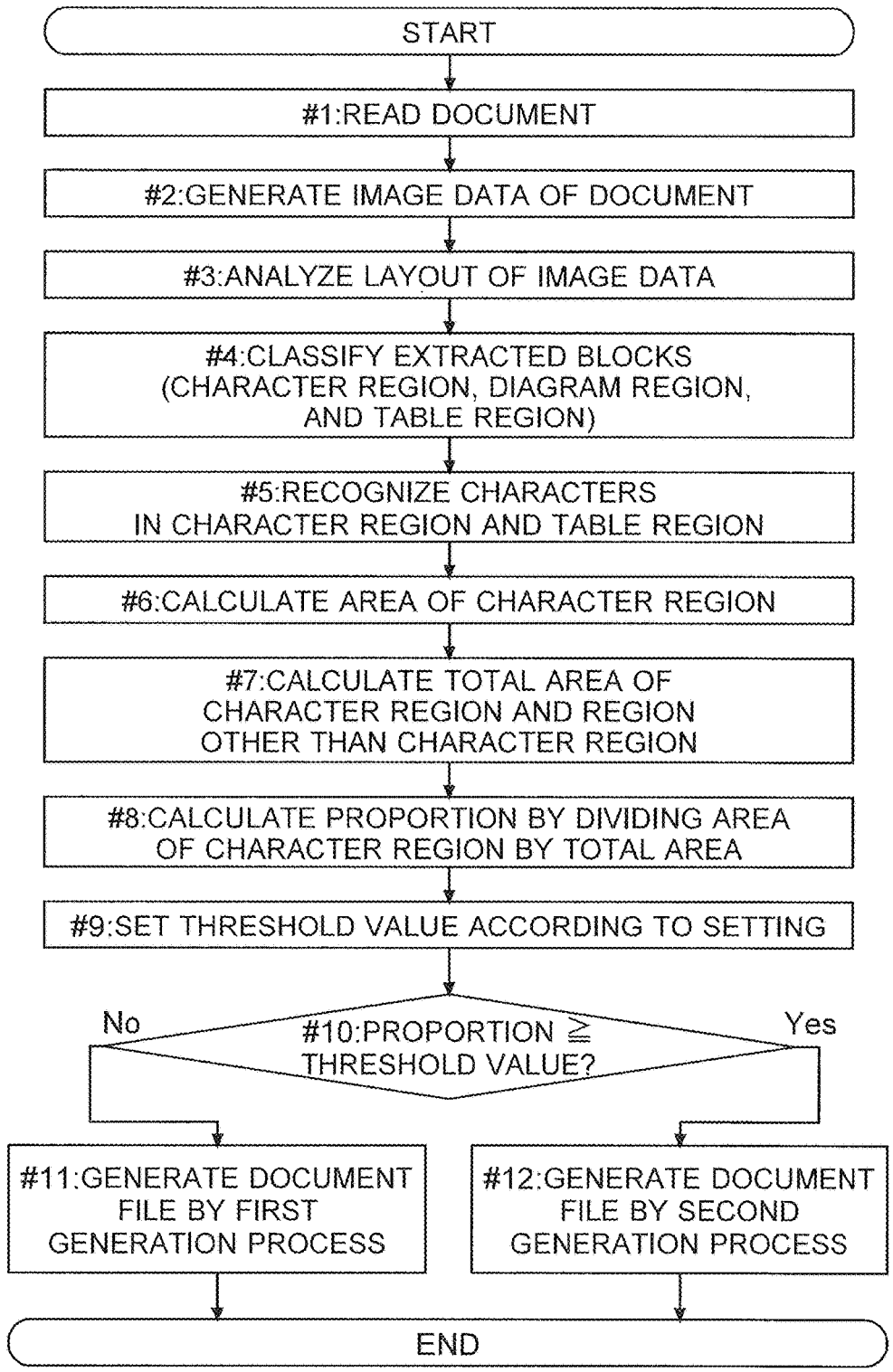
FIG. 9 is a diagram showing an example of the flow of generation of a document file in the multifunction peripheral according to the embodiment.

Here, the flow in FIG. 9 is executed for each document sheet. When a document comprising a plurality of sheets is placed on the document conveying unit 7, the flow in FIG. 9 is executed successively and concurrently. In this case, the document conveying unit 7 conveys the document one sheet after another to the reading position. As document sheets are conveyed successively and the image reading unit 6 generates their image data successively, the layout analyzing portion 81 analyzes the layout of the image data generated by the image reading unit 6 and extracts the regions therefrom. The document file generating portion 83 selects, for each page, whether to perform the first generation process or the second generation process. The document file generating portion 83 generates a document file 10 by the selected process by converting the image data of all pages. The document file generating portion 83 may generate a document file 10 for each page. Or, the document file generating portion 83 may generate a document file 10 having a plurality of pages consolidated.

As described above, an image processing device (multifunction peripheral 100) according to the embodiment includes a layout analyzing portion 81, an OCR processing portion 82, and a document file generating portion 83. The layout analyzing portion 81 analyzes the layout of image data. The layout analyzing portion 81 extracts from the image data a character region 91 that includes characters. The OCR processing portion 82 recognizes the characters included in the character region 91. The OCR processing portion 82 generates text data T1. The document file generating portion 83 calculates a proportion by dividing the area of the character region 91 by the total area of the character region 91 and a region other than the character region. The document file generating portion 83 generates a document file 10 by a first generation process when the proportion is lower than a threshold value. The document file generating portion 83 generates a document file 10 by a second generation process when the proportion is equal to or higher than the threshold value.

With this configuration, based on the size of the character region 91, a generation process to be applied can be automatically selected out of a plurality of kinds of generation processes. Thus, a user is no longer required to select a generation process to be applied. It is thus possible to save a user the trouble of making a setting.

The image data cannot necessarily be converted to be exactly the same as the document. A generated document file 10 can sometimes have a part which conspicuously differs from the document. When, in a page, the character region 91 is small and the region other than the character region is large, to fit them in the document, editing involving adjusting of the positions and sizes of the regions is more likely to be performed. That is, editing involving changing of the layout is more likely to be performed often. Here, by moving a text box 10a, it is possible to move character strings in the text box 10a as a whole. A document file 10 with a text box 10a advantageously allows easy editing and rearranging of the layout. Thus, when the character region 91 is small, by the first generation process, a document file 10 having a text box 10a attached to it is generated. Thus, it is possible to generate a document file 10 that allows easy editing.

When the character region 91 in the page is large, mainly, character strings (text) are subjected to editing. For example, character strings are more likely to be copied and pasted. It is easier to edit character strings (text data T1) attached directly to a document than character strings arranged in a text box 10a. It is also easier to search for text data T1 attached directly to a document than text in a text box 10a. Thus, when the proportion of the character region 9 is large, it is possible, by the second generation process, to generate a document file 10 having text attached directly to it. That is, it is possible to generate a document file 10 suitable for text editing and searching. Thus, it is possible to generate a document file 10 that allows easy editing.

The image processing device further includes a document conveying unit 7 and an image reading unit 6. The document conveying unit 7 conveys a document one sheet after another to a reading position. The image reading unit 6 reads the conveyed document to generate image data. As the document is conveyed one sheet after another successively and the image reading unit 6 generates the image data successively, the layout analyzing portion 81 analyzes, for each page, the layout of the image data generated by the image reading unit 6 and extracts the regions therefrom. The document file generating portion 83 selects, for each page, whether to perform the first generation process or the second generation process. The document file generating portion 83 generates the document file 10 by the selected process by converting the image data of all pages. This eliminates the need to select, for each page, a generation process to be applied when a document comprising a plurality of sheets is successively converted into an electronic format. Thus, no burden is put on a user. It is thus possible to improve the usability.

The layout analyzing portion 81 extracts, from the image data, the character region 91, a diagram region 92 that includes a diagram, and a table region 93 that includes a table. The document file generating portion 83 takes as the total area the sum of the character region 91, the diagram region 92, and the table region 93. The document file generating portion 83 generates a document file 10 having the diagram region 92 attached to it as an image object 10b. The document file generating portion 83 generates a document file 10 having the table region 93 attached to it as a table. Thus, it is possible to determine whether to perform the first generation process or the second generation process with consideration given to a large number of elements included in each page of a document. A diagram and a table are attached to the document file 10 as objects such as an image object 10b and a table. Thus, it is possible to change the layout of characters, diagrams, and tables.

When characters in a page are colorful, a user may sometimes want to move character strings to another position by the color. Thus, the image processing device includes a number-of-colors recognizing portion 84 which counts the number of colors used in the characters included in the character region 91. As the number of colors increases, the document file generating portion 83 sets the threshold value higher. Thus, the threshold value can be adjusted automatically according to the number of colors used in characters in a page. When the number of colors used in characters is large, the threshold value can be automatically adjusted such that a document file 10 having a text box 10*a* attached to it is more likely to be generated. Thus, it is possible to generate a document file 10 that allows easy editing after being generated.

When characters of various sizes (points) are used in a page, a user may sometimes want to move character strings to another position by the size. Thus, the image processing device includes a size recognizing portion 85 which recognizes the size of the characters included in the character region 91. As the number of different sizes used in characters increases, the document file generating portion 83 sets the threshold value higher. Thus, the threshold value can be adjusted automatically according to the size of characters in a page. Specifically, the threshold value can be adjusted automatically such that the larger the number of different sizes used in characters in a page is, the more likely a document file 10 having a text box 10*a* attached to it is generated. Thus, it is possible to generate a document file 10 that allows easy editing after being generated.

The document file generating portion 83 generates a file in an XML format as a document file 10. In recent years, word processing software (word editing software) is compatible with a file in an XML format. Thus, it is possible to generate a document file 10 that offers enhanced versatility.

While some embodiments of the present disclosure have been described above, they are in no way meant to limit the scope of the present disclosure, which thus allows for many modifications and variations within the spirit of the present disclosure.

For example, the description given above deals with an example where a document file 10 is generated based on image data generated by the image reading unit 6. Instead, the image data may be image data received by the communication unit 5. For example, the image data may be image data transmitted from any computer 200. The image data may also be image data transmitted from another image forming apparatus connected via a network.

What is claimed is:

1. An image processing device comprising:
   a layout analyzing portion which analyzes a layout of image data and which extracts from the image data a character region that includes characters;
   an OCR processing portion which recognizes the characters included in the character region and which generates text data;
   a document file generating portion which
      calculates a proportion by dividing an area of the character region by a total area of the character region and a region other than the character region,
      generates a document file by a first generation process when the proportion is lower than a threshold value, and
      generates the document file by a second generation process when the proportion is equal to or higher than the threshold value, wherein
   the first generation process is a process of generating the document file having a text box including the text data attached thereto, and
   the second generation process is a process of generating the document file by writing the text data directly in the document file without using the text box; and
   a number-of-colors recognizing portion which counts a number of colors used in the characters included in the character region, wherein
   as the number of colors increases, the document file generating portion sets the threshold value higher;
   the document file generating portion
      calculates a first calculation value by multiplying the number of colors by a previously set coefficient, and
      sets as a threshold value a value obtained by adding the first calculation value to a previously set reference value.

2. The image processing device of claim 1, further comprising:
   a document conveying unit which conveys a document one sheet after another to a reading position; and
   an image reading unit which reads the conveyed document to generate the image data, wherein
   as the document is conveyed one sheet after another successively and the image reading unit generates the image data successively, the layout analyzing portion analyzes, for each page, the layout of the image data generated by the image reading unit and extracts the regions therefrom,
   the document file generating portion
   selects, for each page, whether to perform the first generation process or the second generation process, and
   generates the document file by the selected first generation process or second generation process by converting the image data of all pages.

3. The image processing device of claim 1, wherein
   the layout analyzing portion extracts, from the image data, the character region, a diagram region that includes a diagram, and a table region that includes a table, and
   the document file generating portion
      takes as the total area a sum of the character region, the diagram region, and the table region,
      generates the document file having the diagram region attached thereto as an image object, and
      generates the document file having the table region attached thereto as table data.

4. An image processing device comprising:
   a layout analyzing portion which analyzes a layout of image data and which extracts from the image data a character region that includes characters;
   an OCR processing portion which recognizes the characters included in the character region and which generates text data;
   a document file generating portion which
      calculates a proportion by dividing an area of the character region by a total area of the character region and a region other than the character region,
      generates a document file by a first generation process when the proportion is lower than a threshold value, and
      generates the document file by a second generation process when the proportion is equal to or higher than the threshold value, wherein
   the first generation process is a process of generating the document file having a text box including the text data attached thereto, and
   the second generation process is a process of generating the document file by writing the text data directly in the document file without using the text box; and a size recognizing portion which recognizes a size of the characters included in the character region, wherein as a number of different sizes increases, the document file generating portion sets the threshold value higher.

5. The image processing device of claim 4, wherein the document file generating portion calculates a second calculation value by multiplying the number of different sizes used in the characters by a coefficient, and sets as a threshold value a value obtained by adding the second calculation value to a previously set reference value.

6. The image processing device of claim 1, wherein the document file generating portion generates a file in an XML format as the document file.

7. A method for controlling an image processing device, the method comprising:

analyzing a layout of image data and extracting from the image data a character region that includes characters;

recognizing the characters included in the character region and generating text data;

calculating a proportion by dividing an area of the character region by a total area of the character region and a region other than the character region;

generating a document file by a first generation process when the proportion is lower than a threshold value;

generating the document file by a second generation process when the proportion is equal to or higher than the threshold value, wherein the first generation process is a process of generating the document file having a text box including the text data attached thereto, and the second generation process is a process of generating the document file by writing the text data directly in the document file without using the text box;

recognizing a size of the characters included in the character region; and setting the threshold value higher as a number of different sizes increases.

8. The image processing device of claim 4, further comprising:

a document conveying unit which conveys a document one sheet after another to a reading position; and an image reading unit which reads the conveyed document to generate the image data, wherein as the document is conveyed one sheet after another successively and the image reading unit generates the image data successively, the layout analyzing portion analyzes, for each page, the layout of the image data generated by the image reading unit and extracts the regions therefrom, the document file generating portion selects, for each page, whether to perform the first generation process or the second generation process, and generates the document file by the selected first generation process or second generation process by converting the image data of all pages.

9. The image processing device of claim 4, wherein the layout analyzing portion extracts, from the image data, the character region, a diagram region that includes a diagram, and a table region that includes a table, and the document file generating portion takes as the total area a sum of the character region, the diagram region, and the table region, generates the document file having the diagram region attached thereto as an image object, and generates the document file having the table region attached thereto as table data.

10. The image processing device of claim 4, wherein the document file generating portion generates a file in an XML format as the document file.

* * * * *